(12) United States Patent
Leppanen et al.

(10) Patent No.: US 12,547,002 B2
(45) Date of Patent: Feb. 10, 2026

(54) UTILIZING A VISIBLE LIGHT FILTER TO REDUCE VISIBILITY OF FIDUCIAL IMAGES

(71) Applicant: Microsoft Technology Licensing, LLC, Redmond, WA (US)

(72) Inventors: Lasse-Petteri Leppanen, Espoo (FI); Xiao Chuan Ong, Seattle, WA (US); Yarn Chee Poon, Redmond, WA (US); Yifei Zhang, Santa Clara, CA (US); Wyatt Owen Davis, Bothell, WA (US); Matthew David Ellis, Sammamish, WA (US); Algird Michael Gudaitis, Fall City, WA (US); Akash Arora, Normandy Park, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 18/470,342

(22) Filed: Sep. 19, 2023

(65) Prior Publication Data
US 2025/0093652 A1    Mar. 20, 2025

(51) Int. Cl.
*G02B 27/01*    (2006.01)
*G09G 3/00*    (2006.01)

(52) U.S. Cl.
CPC ......... *G02B 27/0172* (2013.01); *G09G 3/002* (2013.01); *G02B 2027/0138* (2013.01); *G09G 2320/0693* (2013.01); *G09G 2320/08* (2013.01)

(58) Field of Classification Search
CPC ........ G02B 27/0172; G02B 2027/0138; G02B 27/0179; G02B 27/32; G02B 2027/014;
(Continued)

(56) References Cited

U.S. PATENT DOCUMENTS 9,911,236 B2 * 3/2018 Bar-Zeev ........... G02B 27/0172
10,324,291 B2 6/2019 Robbins
(Continued)

OTHER PUBLICATIONS

International Search Report and Written Opinion received for PCT Application No. PCT/US2024/043785, Jan. 31, 2025, 19 pages.
(Continued)

*Primary Examiner* — Collin X Beatty
(74) *Attorney, Agent, or Firm* — Alleman Hall & Tuttle LLP (57) ABSTRACT

One example provides a head mounted display (HMD) device comprising a projection system and left eye and right eye display optical paths configured to transmit left eye and right eye images for viewing. The projection system comprises left and right display image projectors. The HMD device further comprises a display alignment tracker (DAT) system comprising a DAT optical path comprising left side and right side DAT optical paths. The DAT system further comprises a camera coupled to an output of the DAT optical path, and a visible light filter located along the DAT optical path. The HMD device further comprises a controller configured to control the projection system to output a fiducial image comprising a visible color of light transmitted by the visible light filter and to blank the visible color of the fiducial image from a fiducial portion of both the left and right eye images.

11 Claims, 10 Drawing Sheets

(58) Field of Classification Search
CPC ........... G09G 3/002; G09G 2320/0693; G09G 2320/08
See application file for complete search history.

(56) References Cited

U.S. PATENT DOCUMENTS

| | | |
|---|---|---|
| 10,488,653 B2 | 11/2019 | Wall |
| 2012/0127323 A1 | 5/2012 | Kasuya |
| 2018/0308248 A1 | 10/2018 | Hubert |

OTHER PUBLICATIONS

Invitation to pay additional search fee Received in PCT Application No. PCT/US2024/043785, mailed on Dec. 10, 2024, 10 pages.

\* cited by examiner

UTILIZING A VISIBLE LIGHT FILTER TO REDUCE VISIBILITY OF FIDUCIAL IMAGES

BACKGROUND

A head mounted display (HMD) device may display virtual reality (VR) content and/or augmented reality (AR) content utilizing left eye images and right eye images. These images can be generated using separate left and right display image projectors on the HMD device. However, misalignment between the separate left and right display image projectors can cause a misalignment between the left eye images and the right eye images, such as resulting from temperature changes and/or drift over time of the HMD device. This can cause dipvergence between the left eye images and the right eye images that can impact a user of the HMD device.

HMD devices with non-rigid frames may be more susceptible to misalignment between the images than HMD devices with rigid frames. To address such misalignment issues, some HMD devices utilize a display alignment tracker (DAT) system for monitoring alignment of the left eye images and the right eye images for viewing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a head mounted display (HMD) device comprising a projection system comprising a left display image projector and a right display image projector. The HMD device further comprises a left eye display optical path configured to transmit left eye images from the projection system for viewing and a right eye display optical path configured to transmit right eye images from the projection system for viewing. The HMD device further comprises a display alignment tracker (DAT) system comprising a DAT optical path. The DAT optical path comprises a left side DAT optical path and a right side DAT optical path. The DAT system further comprises a camera optically coupled to an output of the DAT optical path, and a visible light filter located along the DAT optical path. The HMD device further comprises a controller configured to control the projection system to output a fiducial image comprising a visible color of light transmitted by visible light filter. The controller is further configured to blank the visible color of the fiducial image from a fiducial portion of both the left eye images and the right eye images.

Another example provides a head mounted display (HMD) device comprising a projection system comprising a left display image projector and a right display image projector. The HMD device further comprises a left eye display optical path configured to transmit left eye images from the projection system for viewing, a right eye display optical path configured to transmit right eye images from the projection system for viewing, and a display alignment tracker (DAT) system. The DAT system comprises a DAT optical path comprising a left side DAT optical path and a right side DAT optical path. The DAT system further comprises a camera optically coupled to an output of the DAT optical path, and a visible light filter located along the DAT optical path. The HMD device further comprises a controller configured to control the projection system to output a fiducial image comprising a color of light transmitted by the visible light filter.

Another example provides a head mounted display (HMD) device comprising a projection system comprising a left display image projector and a right display image projector. The HMD device further comprises a left eye display optical path configured to transmit left eye images from the projection system for viewing, a right eye display optical path configured to transmit right eye images from the projection system for viewing, and a display alignment tracker (DAT) system. The DAT system comprises a DAT optical path comprising a left side DAT optical path and a right side DAT optical path, a camera, and a mirror device located along the DAT optical path and operable to selectively deliver light from the left side DAT optical path or the right side DAT optical path to the camera. The HMD device further comprises a controller configured to control a state of the mirror device.

DETAILED DESCRIPTION

As mentioned above, some HMD devices may utilize a DAT system to monitor alignment of left eye images and right eye images for viewing by monitoring fiducial images projected along with the images for viewing. Such DAT systems enable the HMD device to positionally adjust the left eye images and/or the right eye images to help reduce user discomfort, such as can arise from the previously mentioned dipvergence. Current DAT systems comprise a camera to detect left side and right side fiducial images for monitoring the alignment of left side and right side images for viewing. The fiducial images are located in fiducial portions of the left side and right side images for viewing. However, current DAT systems can have signal to noise ratio (SNR) issues at the camera. More specifically, light from the left eye and right eye images for viewing are considered as noise to the fiducial image signal at the camera. This may interfere with determining the alignment of the left eye and right eye images for viewing.

Some DAT systems may utilize a prism to direct light from the left eye and right eye images and the fiducial image to the camera. Such prisms may have a 50/50 interface where 50% of light incident on the interface is transmitted and 50% is reflected. This may result in losing 50% of the light through the prism, resulting in reduced light intensity at the camera.

One possible solution to maintain a desired SNR at the camera is to perform total blanking of light of the left eye and right eye images from a fiducial portion in both the left eye and right eye images. However, such total blanking can be visually disruptive to the user of the HMD device.

Accordingly, examples are disclosed that relate to utilizing a visible light filter to help reduce visibility of a fiducial image while maintaining a desired SNR of the fiducial image. Briefly, an HMD device comprises a DAT system having a visible light filter located along a DAT optical path. The DAT system further comprises a camera optically coupled to an output of the DAT optical path. The HMD device also comprises a controller configured to control a projection system to output a fiducial image comprising a color of light transmitted by the visible light filter. As used herein, the term "color of light" refers to a selected light wavelength or wavelength band within a range of ultraviolet (UV) wavelengths, visible wavelengths, and infrared (IR) wavelengths. In various examples, the fiducial image can include visible of light (e.g., a blue color), UV light, and/or IR light.

The HMD device also comprises display optical paths configured to transmit left eye images and right eye images for viewing from the projection system. In examples where the fiducial image comprises a visible color of light, the controller is also configured to blank the visible color of the fiducial image from a fiducial portion of both the left eye images and the right eye images. Such color-specific blanking is referred to herein as "color blanking." This color blanking may be less visually disruptive to a user of the HMD device than total blanking.

Figure 1A:
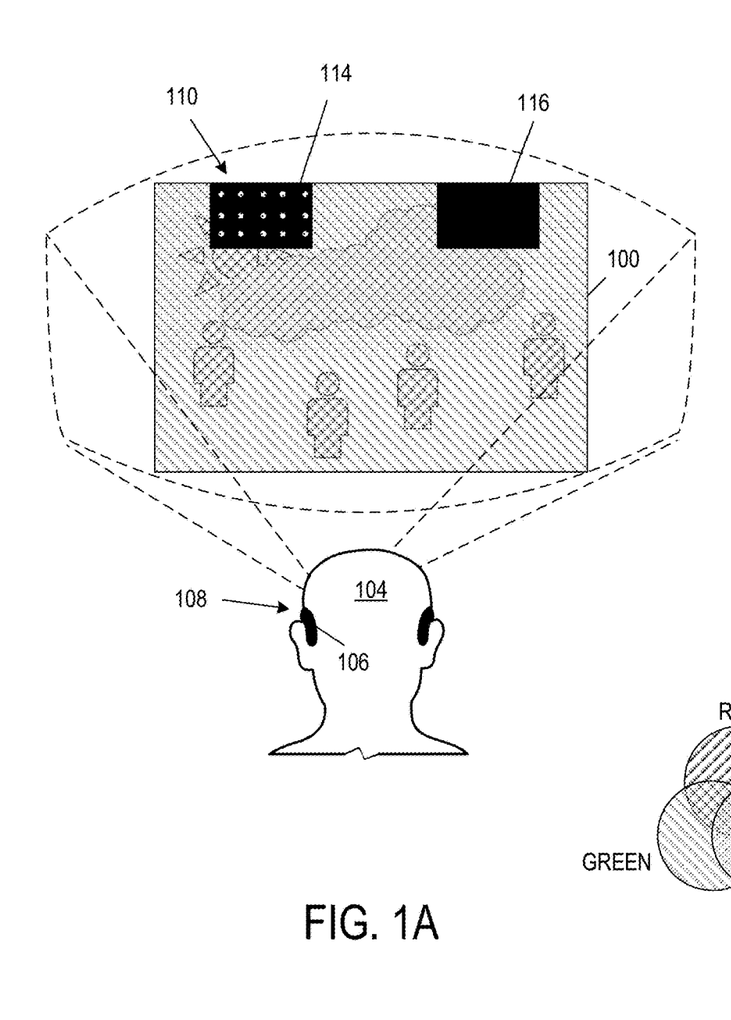
FIGS. 1A-1B schematically depict example left eye images and right eye images for viewing, respectively.
Figure 1B:
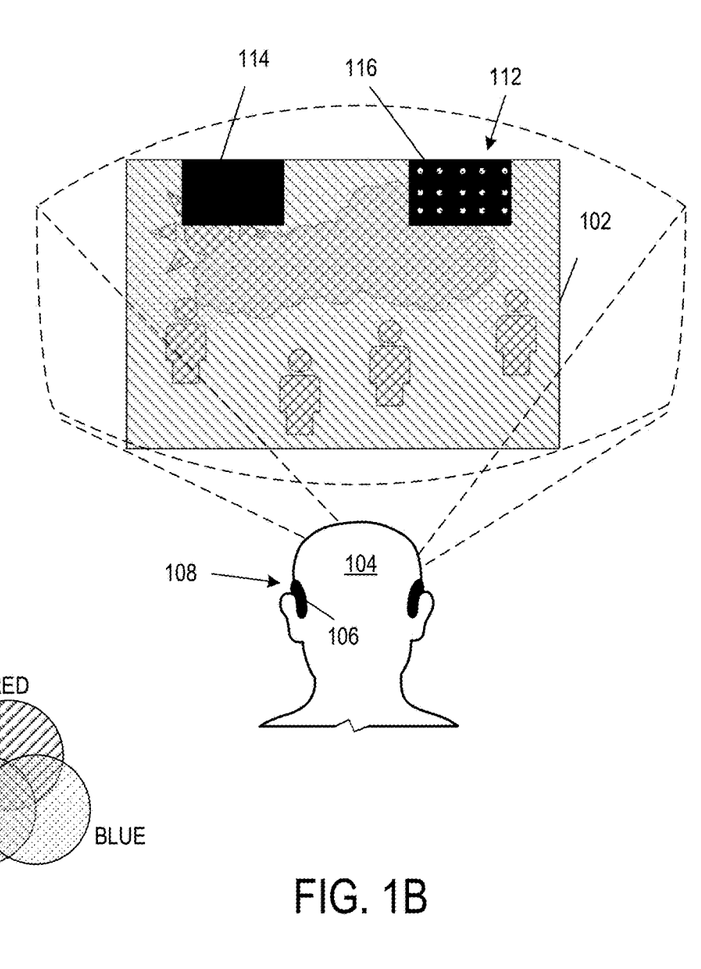

FIGS. 1A and 1B schematically depict example a left eye image 100 and a right eye image 102 respectively, with total blanking in fiducial regions of the left eye image 100 and the right eye image 102. Here, a user 104 utilizes an HMD device 106 to view the left eye image 100 and the right eye image 102. In the depicted example, the left eye image 100 and the right eye image 102 utilize a RGB additive color space (e.g., additive color theory using a red color, a green color, and a blue color). In other examples, another additive color space or subtractive color space can be used.

HMD device 106 comprises a projection system 108 comprising a left display image projector and a right display image projector respectively configured to output the left eye image 100 and the right eye image 102. Each projected pixel comprises a red sub-pixel, a green sub-pixel and a blue sub-pixel for the RGB additive color space. Projection system 108 can be controlled to output a left fiducial image 110 and a right fiducial image 112 for monitoring alignment of left eye image 100 and right eye image 102. As depicted, the projection system 108 is controlled to perform total blanking in left fiducial portion 114 and right fiducial portion 116 for both left eye image 100 and right eye image 102. In other words, the content of the left eye and right eye images for viewing is not displayed in the left fiducial portion 114 and the right fiducial portion 116. Further, projection system 108 outputs left fiducial image 110 in left fiducial portion 114 of left eye image 100. As can be seen, projection system 108 also outputs right fiducial image 112 in right fiducial portion 116 of right eye image 102. However, the total blanking of the left eye and right eye images for viewing in the left fiducial portion 114 and the right fiducial portion 116 may be distracting to user 104.

As such, the disclosed examples utilize a visible light filter configured to transmit a color of light of a fiducial image while blocking at least some visible light that is not the color used for the fiducial image. The visible light filter enables blanking of the color of light of the fiducial image but not at least some other colors. Color blanking can help to reduce the visual distractibility of a fiducial image to a user while maintaining a desired SNR of the fiducial image.

Figure 2:
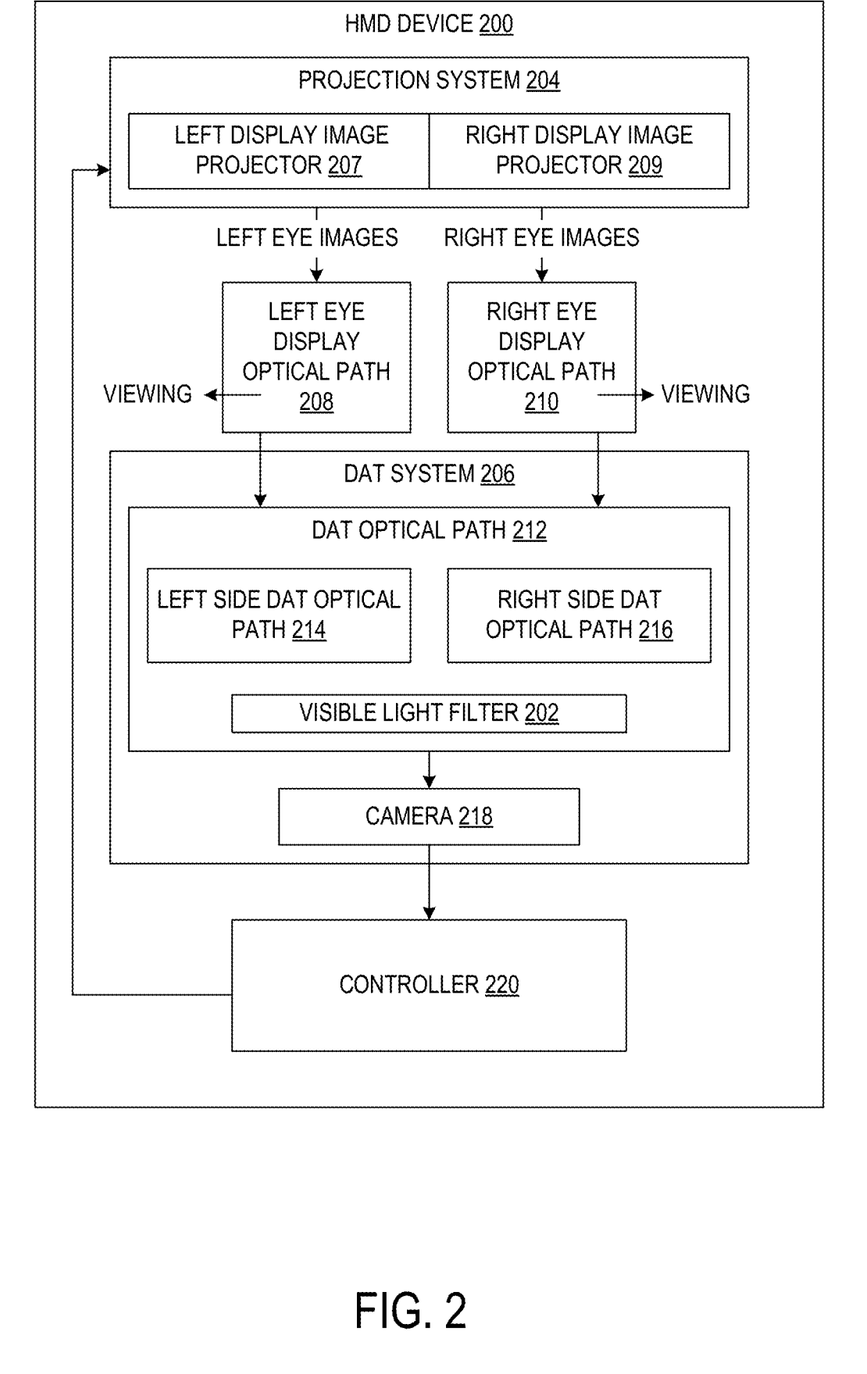
FIG. 2 shows a block diagram of an example HMD device comprising a DAT system.

FIG. 2 shows a block diagram of an example HMD device 200 that utilizes a visible light filter 202 configured to filter one or more visible colors of light in DAT optical path. HMD device 200 comprises a projection system 204 and a display alignment tracker (DAT) system 206 for monitoring alignment of images for viewing. Projection system 204 comprises a left display image projector 207 and a right display image projector 209. HMD device 200 further comprises a left eye display optical path 208 configured to transmit left eye images from left display image projector 207 for viewing. HMD device 200 also comprises a right eye display optical path 210 configured to transmit right eye images from right display image projector 209 for viewing.

DAT system 206 comprises a DAT optical path 212 comprising a left side DAT optical path 214 and a right side DAT optical path 216. Left side DAT optical path 214 is indicative of an alignment of left eye display optical path 208. Right side DAT optical path 216 is indicative of an alignment of right eye display optical path 210. DAT system 206 further comprises a camera 218 optically coupled to an output of DAT optical path 212. Camera 218 is configured to detect light traveling along left side DAT optical path 214 and right side DAT optical path 216.

Visible light filter 202 is located along DAT optical path 212. More specifically, visible light filter 202 is located along a portion DAT optical path 212 that is not shared by left eye display optical path 208 or right eye display optical path 210. Example locations of visible light filter 202 are discussed with reference to FIGS. 5 and 6. In some examples, visible light filter 202 can comprise a single filter located along a portion of DAT optical path 212 that is shared by both left side DAT optical path 214 and right side DAT optical path 216. In other examples, visible light filter 202 can comprise a first filter located along left side DAT optical path 214 and a second filter located along right side DAT optical path 216. Examples of visible light filter 202 include diffractive filters, absorptive filters, and reflective filters. In other examples, DAT system 206 can comprise additional optical components, such as mirrors and/or waveguides, for example. Examples of such DAT systems are described in more detail below.

HMD device 200 further comprises a controller 220 configured to control projection system 204 to output a fiducial image comprising a visible color of light transmitted by visible light filter 202. Thereby, controller 220 is also configured to control projection system 204 to blank the visible color of the fiducial image from a fiducial portion of both the left eye image and the right eye image, as discussed with reference to FIG. 3. This can help to maintain an SNR of the fiducial image at camera 218 while also helping to reduce the visual impact on the left eye image and the right eye image for a user. In some examples utilizing the RGB additive color space, the fiducial image can comprise a blue color. In such examples, visible light filter 202 is configured to filter red and green colors. Such a configuration can help to reduce visibility of the fiducial image to the user, as human eyes may perceive the blue color less than the other visual colors.

Controller 220 can also be configured to positionally adjust one or more of the left eye images or the right eye images based at least in part on an output of camera 218. This can help to compensate for misalignments. As described above, misalignment of left display image projector 207 and right display image projector 209 can result from such factors as thermal expansion due to temperature changes, bending, mechanical damage (e.g., due to dropping), and other conditions and/or events.

The display of fiducial images and potential adjustment of the left eye images and/or the right eye images can be performed at any suitable frequency. In some examples, controller 220 can be configured to display the fiducial images and potentially adjust the left eye images and/or the right eye images based upon on a time interval, such as within a range of one to ten minutes. In other examples, the display of fiducial images and potential adjustment of the left eye images and/or the right eye images can be performed based upon user input, upon sensing motion data (e.g., from left side and right side inertial measurement units) that indicates possible misalignment (e.g., due to bending, dropping, etc.), upon sensing eye-tracking data (e.g., from eye tracking sensors) that indicate possible user discomfort, or based upon any other suitable trigger. Further, in various examples, controller 220 can also be configured to control projection system 204 to output the left fiducial image and/or the right fiducial image in a same video image frame or in different video image frames.

Figure 3:
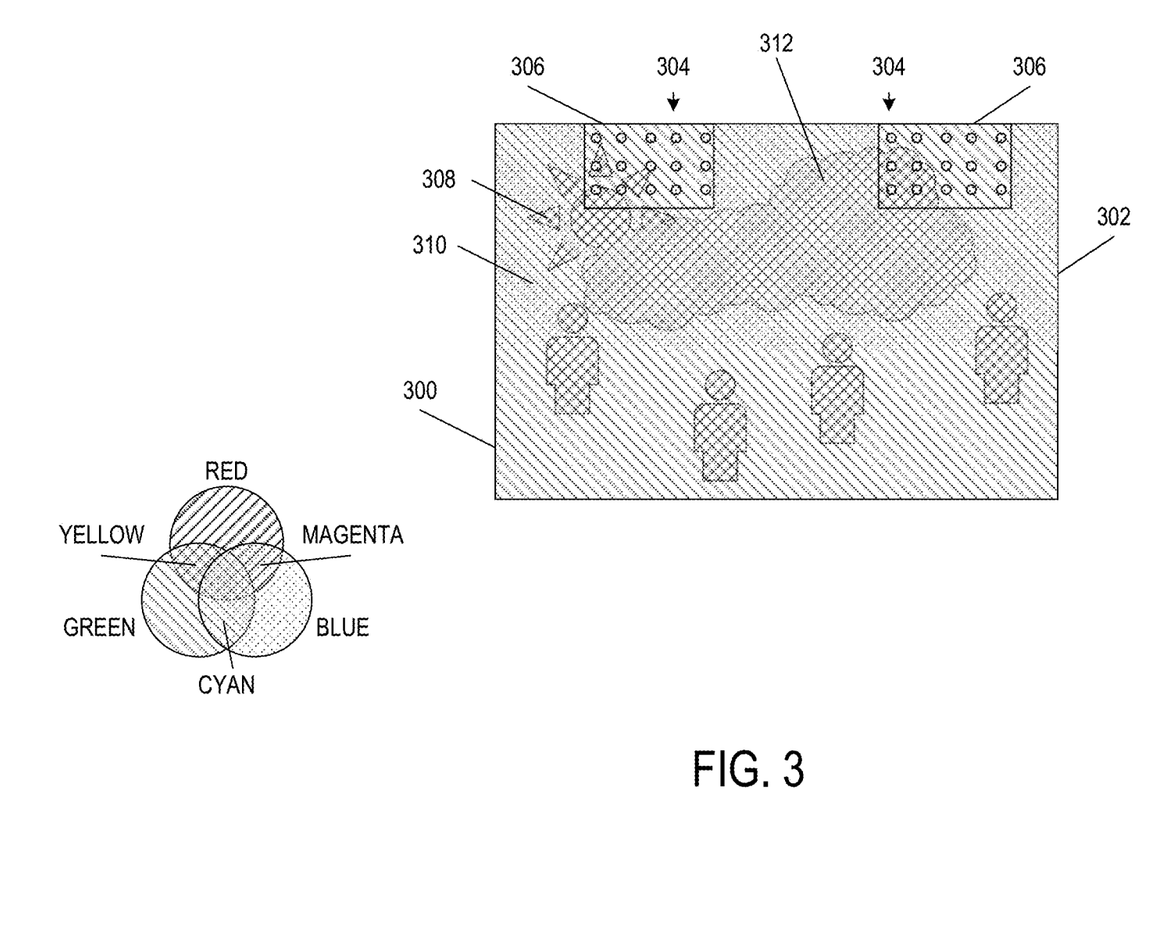
FIG. 3 schematically depicts example color blanking in left eye images and right eye images.

As previously mentioned, an HMD device can perform color blanking to maintain a desired SNR of a fiducial image at a camera while helping to reduce a visual distraction of the fiducial image. FIG. 3 schematically depicts example color blanking in left eye images 300 and right eye images 302. The color blanking of FIG. 3 can be performed by any suitable HMD device, such as HMD device 200. The depicted example of FIG. 3 uses the additive RGB color space. In other examples, another color space can be used.

A fiducial image 304 comprises a visible color of light and is located in a fiducial portion 306. In the depicted example, the visible color of light of the fiducial image 304 is depicted as blue. In other examples, other colors of light can be used.

As can be seen, the blue color of fiducial image 304 is blanked from fiducial portion 306 of both left eye images 300 and right eye images 302. Here, a sun 308 comprises red and green colors. Thus, the sun 308 is unaffected by the color blanking of the blue color in fiducial portion 306. Further, a sky 310 comprises green and blue. Therefore, sky 310 may be perceived as greenish in color in fiducial portion 306. Outside of fiducial portion 306, clouds 312 are perceived as white due to the combination of the red color, the green color, and the blue color. In fiducial portion 306, clouds 312 may be perceived as yellow in color, resulting from the color blanking of the blue color. While color blanking leads to some changes in appearance of displayed images, the changed coloration may be less noticeable than a total blanking of all colors of the image for display in the fiducial region. Thus, utilizing a visible color filter for a DAT optical path and color blanking can reduce a visual impact of a fiducial image compared to utilizing total blanking.

Figure 4A:
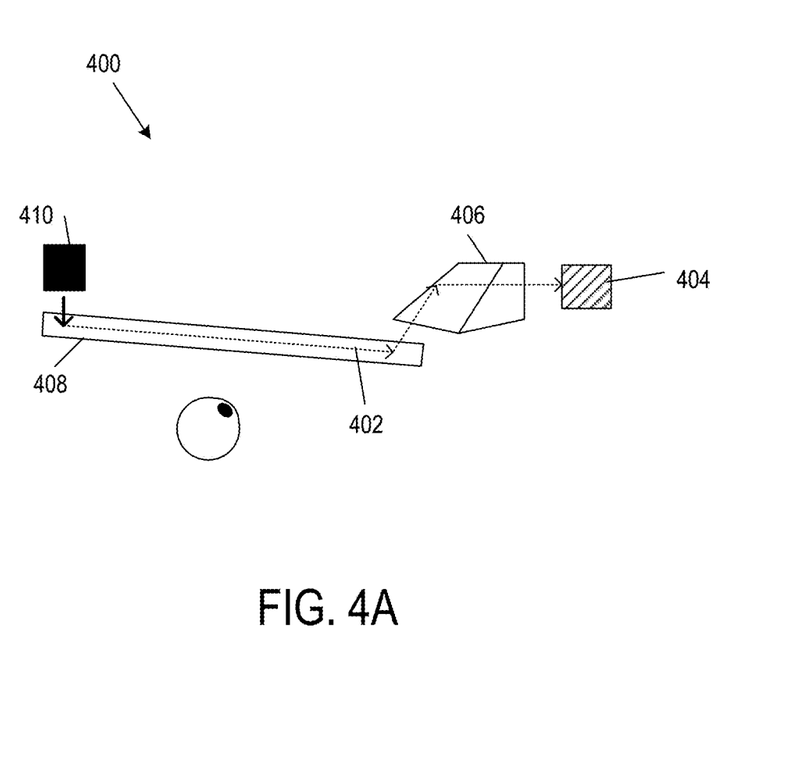
FIG. 4A schematically depicts a top view of an example DAT optical path.

A DAT system to enable color blanking can have various implementations. FIG. 4A schematically depicts a top view of an example DAT system 400. Right side components of DAT system 400 are omitted for clarity. Any suitable HMD device can utilize DAT system 400, such as HMD device 200.

DAT system 400 comprises a DAT optical path 402 (only left side DAT optical path is depicted) and a camera 404 coupled to an output of DAT optical path 402. In the current example, a prism 406 directs light traveling along DAT optical path 402 to camera 404. In other examples, prism 406 can be omitted and/or another optical device can be used, such as a switchable mirror device or a combiner waveguide, for example.

Figure 4B:
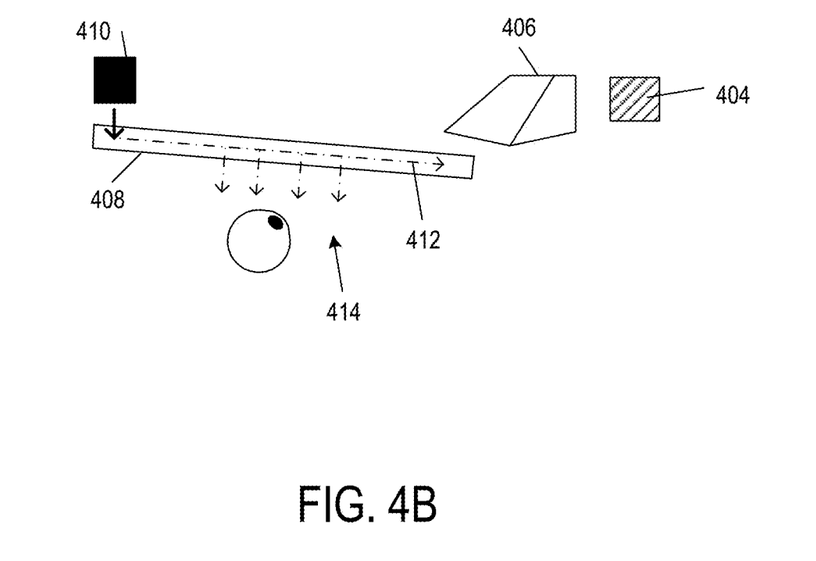
FIG. 4B schematically depicts a top view of an example display optical path.

As depicted, a portion of DAT optical path 402 is located within a display waveguide 408. A fiducial image from a projection system 410 travels along DAT optical path 402 by total internal reflection through display waveguide 408. With reference to FIG. 4B, a display optical path 412 (only a left eye display optical path is depicted) also comprises a portion located within display waveguide 408. Display optical path 412 is configured to transmit images from projection system 410 for viewing, as indicated at 414. While DAT optical path 402 and display optical path 412 are depicted separately for clarity, it will be understood that the light traveling through display waveguide 408 may travel along corresponding portions of both DAT optical path 402 and display optical path 412. FIGS. 4A and 4B are illustrative. In other examples, DAT optical path 402 and/or display optical path 412 can have another configuration.

Figure 5:
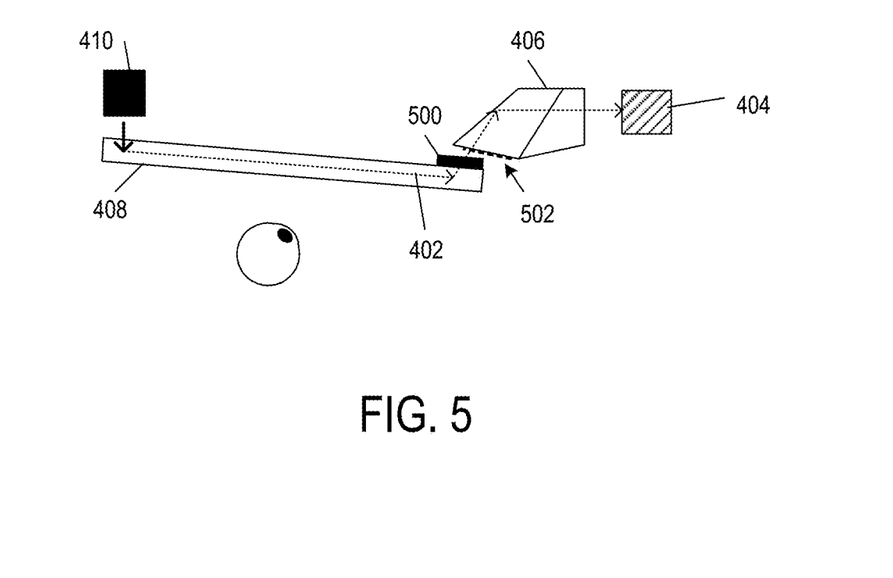
FIGS. 5-6 schematically depict example placements of a visible color filter along the DAT optical path of FIG. 4A.
Figure 6:
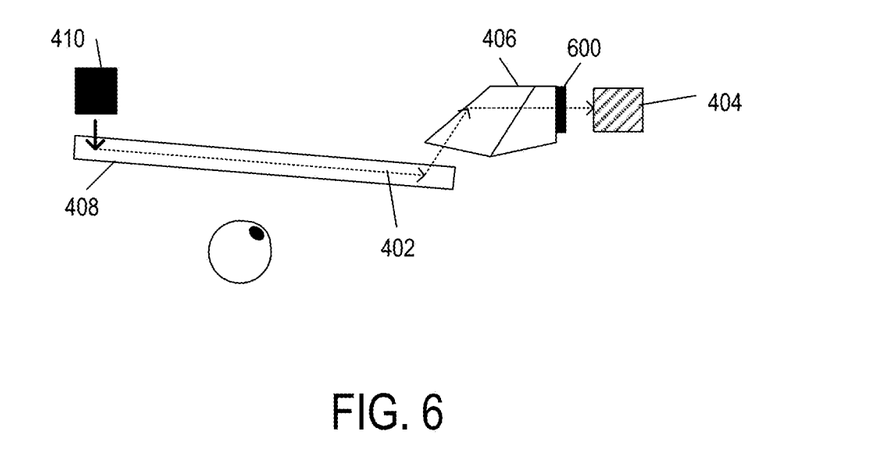

As previously mentioned, a visible light filter can be positioned in various locations along a DAT optical path. FIGS. 5 and 6 schematically depict various example locations of a visible light filter 500 along DAT optical path 402. In FIG. 5, visible light filter 500 is located at a DAT out-coupling of display waveguide 408. Here, visible light filter 500 comprises one or more coatings on display waveguide 408, such as a multi-layer dielectric reflector, for example. Similarly, another visible light filter can be located along a right side DAT optical path (not shown). Alternately or additionally, a visible light filter can be located at an incoupling of prism 406, as indicated by 502. Alternatively or additionally, a visible light filter can be located at an out-coupling of prism 406, as depicted by visible light filter 600 of FIG. 6. In such a location, visible light filter 600 can comprise a same filter for both the left side DAT optical path and the right side DAT optical path. FIGS. 5 and 6 are illustrative. In other examples, a visible light filter0 can be at another location along DAT optical path 402. In further examples, one or more additional visible light filters can also be used.

Figure 7:
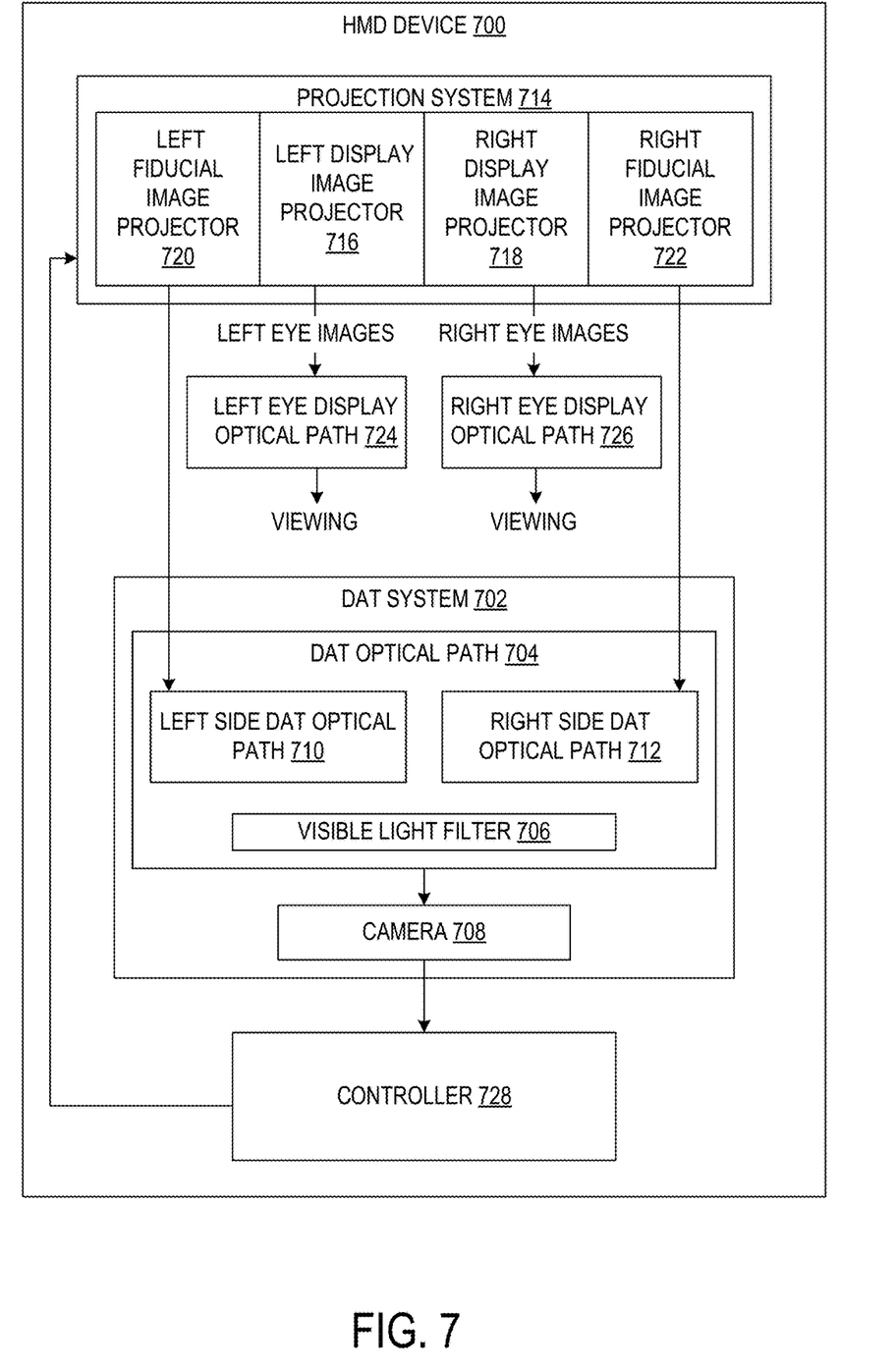
FIG. 7 shows a block diagram of another example HMD device that utilizes separate fiducial and display image projectors.

In the above examples, a fiducial image comprises a color of light that is also in left eye and right eye images for viewing. In other examples an HMD device alternatively or additionally can comprise fiducial image projectors such that the fiducial image is output in a color of light not in the left eye and right eye images for viewing. FIG. 7 shows a block diagram of an example HMD device 700 that utilizes separate fiducial image projectors and display image projectors. Similar to HMD device 200, HMD device 700 comprises a DAT system 702 comprising a DAT optical path 704, a visible light filter 706, and a camera 708. Further, DAT optical path 704 comprises a left side DAT optical path 710 and a right side DAT optical path 712.

HMD device 700 further comprises a projection system 714. Projection system 714 comprises a left display image projector 716 configured to output left eye images for viewing in a similar matter as projection system 204. Similarly, projection system 714 also comprises a right display image projector 718 configured to output right eye images for viewing. Projection system 714 further comprises a left fiducial image projector 720 configured to output a left fiducial image comprising a color of light that is not emitted from left display image projector 716. Such a configuration can help to enable omitting color blanking from left display image projector 716 while also helping to maintain a desired SNR of the left fiducial image at camera 708. In various examples, the left fiducial image projector 720 can be configured to output a color of light (IR light, UV light, and/or visible light) that is different than the colors of light output by left display image projector 716. In some examples that utilize the RGB additive color space, left fiducial image projector 720 can be configured to output a yellow color, such as by a laser configured to generate light at 575 nm (nanometers), for example. In such examples, visible light filter 706 is configured to filter red, green, and blue light emitted from left display image projector 716. Similarly, projection system 714 also comprises a right fiducial image projector 722 configured to output a color of light that is not emitted by right display image projector 718.

HMD device 700 further comprises a left eye display optical path 724 configured to transmit left eye images from the left display image projector 716 for viewing. Additionally, HMD device 700 also comprises a right eye display optical path 726 configured to transmit right eye images from the right display image projector 718 for viewing. In some examples, the left eye display optical path 724 and the right eye display optical path 726 comprise out-couplings configured to outcouple, for viewing, corresponding colors of light from the left and right display image projectors 716, 718. In some such examples, the color of light emitted from the fiducial image projectors may also be outcoupled for viewing at a lower optical intensity. The lower optical intensity may help to reduce visibility of the color of light from the fiducial image projectors compared to the light of the left eye and right eye images for viewing.

HMD device 700 further comprises a controller 728 configured to control projection system 714 to output fiducial images, left eye images for viewing, and/or right eye images for viewing, as previously discussed. Visible light filter 706, left fiducial image projector 720, and right fiducial image projector 722 can help to maintain a desired SNR at camera 708 while also enabling omitting the color blanking from the left display and the right display image projectors 716, 718. Therefore, HMD device 700 can help to reduce a visual distraction of the fiducial image to a user of HMD device 700 compared to HMD device 200.

Figure 8:
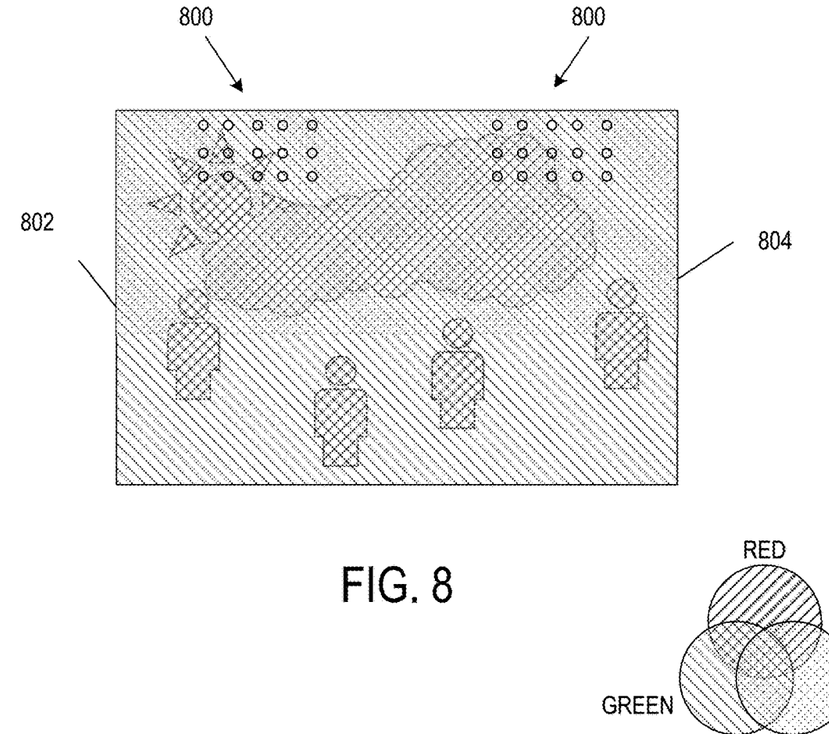
FIGS. 8-9 schematically depict example images that are displayed utilizing display image projectors and fiducial image projectors.
Figure 9:
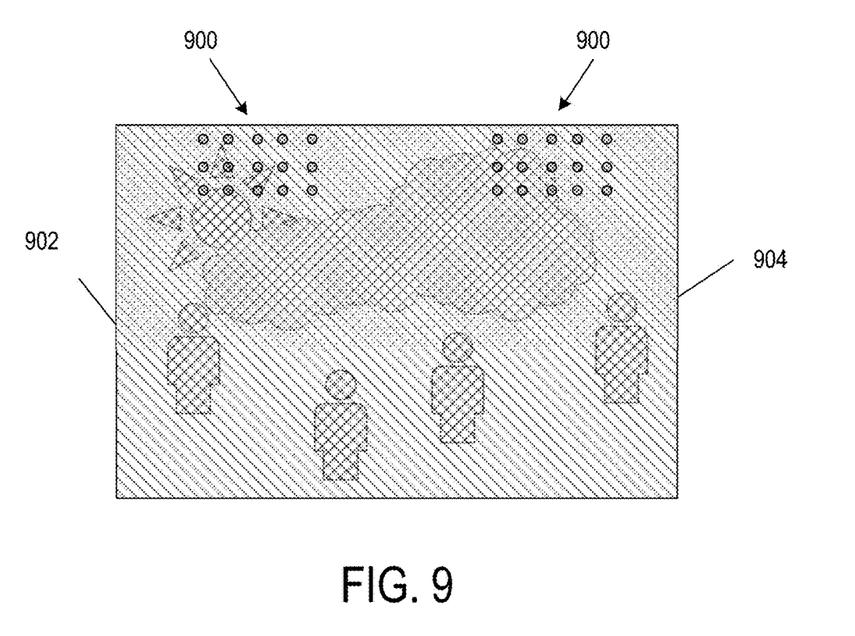

An HMD device utilizing separate display image projectors and fiducial image projectors can omit color blanking while also helping to maintain a desired SNR of a fiducial image. FIGS. 8 and 9 schematically depict example left eye and right eye images from an HMD device comprising separate display image projectors and fiducial image projectors, such as HMD device 700. The depicted examples of FIGS. 8 and 9 utilize the RGB additive color space, but can utilize other color spaces in other examples. FIG. 8 illustrates an example fiducial image 800 comprising IR light and/or UV light. While fiducial image 800 is depicted with solid lines for illustrative purposes, it will be understood that fiducial image 800 may be less visible, or invisible, to a user of the HMD device than illustrated in FIG. 8. As can be seen, left eye images 802 for viewing and right eye images 804 for viewing do not have color blanking around fiducial image 800. A SNR of fiducial image 800 can be maintained by the use of a visible light filter located along a DAT optical path without color blanking. Here, the visible light filter passes the IR light and/or the UV light of fiducial image 800. In the depicted example, the visible light filter is configured to filter the colors of light in left eye images 802 and right eye images 804. In other examples, the visible light filter can also filter another color of light, such as across the visual spectrum, for example.

In further examples, a fiducial image 900 can comprise a visible color of light that is different than the colors of light in left eye images 902 and right eye images 904, as illustrated in FIG. 9. As a specific example utilizing the RGB additive color space, an example red color comprises a wavelength of 630 nm, and an example green color comprises a wavelength of 520 nm. Here, a combination of the red color and the green color is perceived as yellow in color. Further, fiducial image 900 projected by a fiducial image projector comprises a yellow color having a wavelength of 575 nm. In the current example, a visible light filter is configured to filter the red color (e.g., 630 nm), the green color (e.g., 520 nm), and the blue color, but not the yellow color (e.g., 575 nm). Therefore, the visible light filter can transmit the yellow color (e.g., 575 nm) through to a camera. In such a manner, left eye images 902 and right eye images 904 can avoid color blanking while maintaining a suitable SNR of fiducial image 900.

Figure 10:
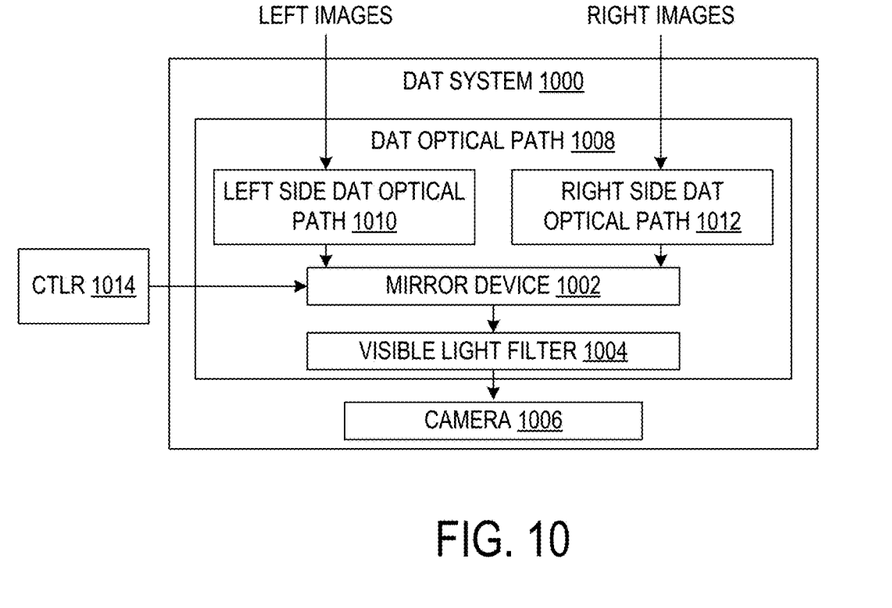
FIG. 10 depicts a block diagram of an example DAT system that utilizes a mirror device.

The above examples comprise a prism having a 50/50 interface at which light is lost. In other examples, a mirror instead of the prism can be used along a DAT optical path to reduce light loss. FIG. 10 shows a block diagram of an example DAT system 1000 that utilizes a mirror device 1002 to switch between left and right DAT optical paths, instead of a prism to combine left and right side DAT optical paths. The use of a mirror device to switch between the left and right DAT optical paths can help to reduce light losses, and thereby allow the use of lower light intensities for the fiducial image. This can help to conserve power. The DAT system 1000 can be used by any suitable HMD device, such as HMD device 200 and HMD device 700, for example.

Similar to DAT system 206, DAT system 1000 comprises a visible light filter 1004, a camera 1006, and a DAT optical path 1008 comprising a left side DAT optical path 1010 and a right side DAT optical path 1012. In the depicted example, left side DAT optical path 1010 is configured to receive any suitable combination of a left fiducial image and/or left eye images (collectively depicted here as "left images"). Similarly, right side DAT optical path 1012 is configured to receive right images.

Mirror device 1002 is located along DAT optical path 1008. Mirror device 1002 is operable to selectively deliver light from left side DAT optical path 1010 or right side DAT optical path 1012 to camera 1006. In some examples, mirror device 1002 can take the form of a microelectromechanical system (MEMS). Mirror device 1002 comprises a first mechanical state and a second mechanical state for selectively delivering the light. More specifically, the first mechanical state corresponds to a mirror position of mirror device 1002 that delivers light from left side DAT optical path 1010 to camera 1006. The second mechanical state corresponds to a mirror position that delivers light from right side DAT optical path 1012 to camera 1006. In some examples, mirror device 1002 can comprise mechanical stops located to define the first mechanical state and the second mechanical state of mirror device 1002. Such mechanical stops help to enable easy control of mirror device 1002. In other examples, another mechanism can be used to define the first and second mechanical states.

Mirror device 1002 can comprise any suitable construction. In some examples, mirror device 1002 comprises an aluminum coating on a mirror surface. In other examples, mirror device 1002 can comprise a single crystal silicon, or other suitably reflective surface. The single crystal silicon may be atomic layer level smooth. Such configurations can help to lose less incident light (e.g., higher efficiency) through mirror device 1002 than a prism. In some examples, mirror device 1002 may have efficiencies over 90% efficiency, as compared to a prism with approximately 50% efficiency. Thereby, mirror device 1002 can help to reduce optical power to generate a fiducial image on the HMD device.

In some examples, a portion of mirror device 1002 can be formed in a frame of the HMD device, such as by using a molded interconnect substrate located in a portion of the frame of the HMD device. The molded interconnect substrate can enable the use of additive manufacturing to create corresponding circuits of mirror device 1002. Such configurations can help to reduce size and/or production costs of mirror device 1002 compared to using a separate printed circuit board (PCB) to create the corresponding circuits. Alternatively or additionally, a MEMS mirror device can comprise etched structures configured to provide the first and second mechanical states of mirror device 1002. In such a manner, mirror device 1002 can help to reduce weight and/or size of an HMD device over a prism, especially when the MEMS is coupled with the molded interconnect substrate. In other examples, mirror device 1002 can have another configuration. A controller 1014 is configured to control the state of mirror device 1002, such as between the first and second mechanical states, for example. In other examples, DAT system 1000 can further comprise additional components not shown.

Figure 11:
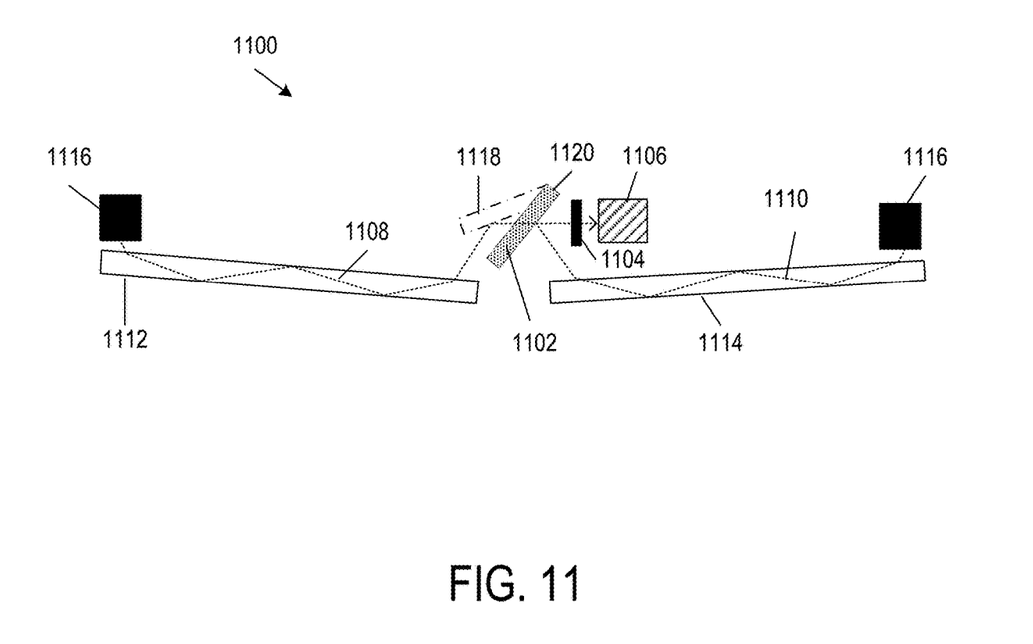
FIG. 11 schematically illustrates an example implementation of the DAT system of FIG. 10.

FIG. 11 schematically depicts a top view of an example DAT system 1100 comprising a mirror device 1102. DAT system 1100 is an example implementation of DAT system 1000. Similar to DAT system 1000, DAT system 1100 comprises a visible light filter 1104, a camera 1106, and a DAT optical path comprising a left side DAT optical path 1108 and a right side DAT optical path 1110. In the depicted example, a portion of left side DAT optical path 1108 is located within a left display waveguide 1112 and a portion of right side DAT optical path 1110 is located within a right display waveguide 1114. Further, a projection system 1116 is configured to output light to left display waveguide 1112 and/or right display waveguide 1114. While visible light filter 1104 is depicted downstream of mirror device 1102, visible light filter 1104 can have other configurations and/or be in different locations in other examples.

Mirror device 1102 comprises a first mechanical state 1118 and a second mechanical state 1120. As depicted, when in first mechanical state 1118, mirror device 1102 is configured to direct light traveling along left side DAT optical path 1108 to camera 1106. Further, when in second mechanical state 1120, mirror device 1102 is configured to direct light traveling along right side DAT optical path 1110 to camera 1106. Mirror device 1102 can provide a higher light efficiency along the DAT optical path than a prism. Additionally mirror device 1102 can be a smaller size than the prism.

Figure 12:
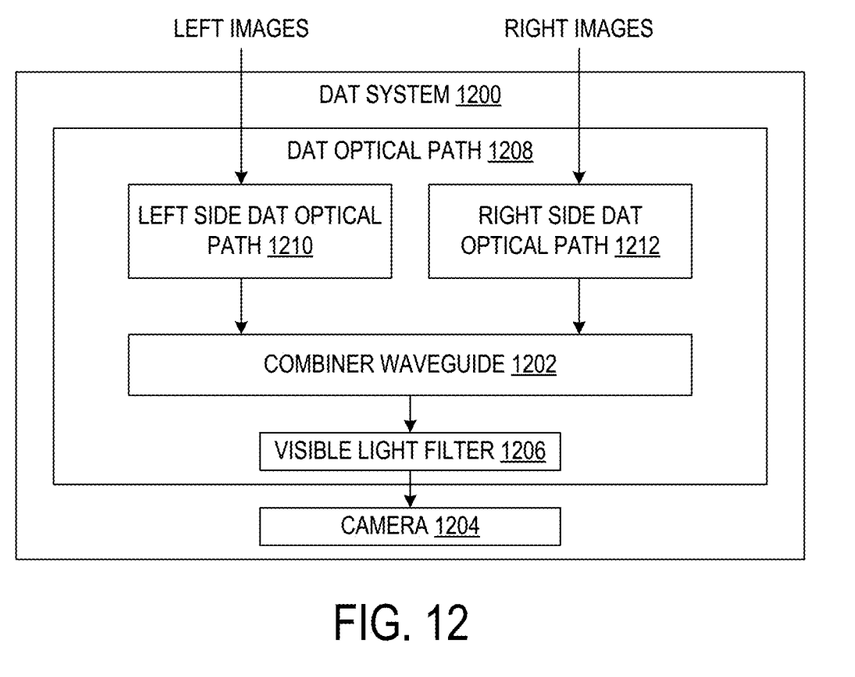
FIG. 12 depicts a block diagram of an example DAT system that utilizes a combiner waveguide.

In other examples, instead of using a prism or a mirror to combine left and right DAT optical paths, a waveguide combiner can be used. A combiner waveguide is smaller than a prism and can provide cost savings compared to a prism or mirror device. FIG. 12 shows an example DAT system 1200 comprising a combiner waveguide 1202. Similar to DAT system 1000, DAT system 1200 comprises a camera 1204, a visible light filter 1206, and a DAT optical path 1208 comprising a left side DAT optical path 1210 and a right side DAT optical path 1212. Combiner waveguide 1202 is used to deliver light from left side DAT optical path 1210 and right side DAT optical path 1212 to camera 1204. Combiner waveguide 1202 is located along DAT optical path 1208. More specifically, combiner waveguide 1202 is located such that left side DAT optical path 1210 and right side DAT optical path 1212 combine at an output of DAT optical path 1208. In some examples, the DAT optical paths comprise diffractive optics to control the paths of light. Combiner waveguide 1202 may be smaller than a prism. Therefore, the use of combiner waveguide 1202 can help to reduce weight and/or production costs of the HMD device.

Figure 13:
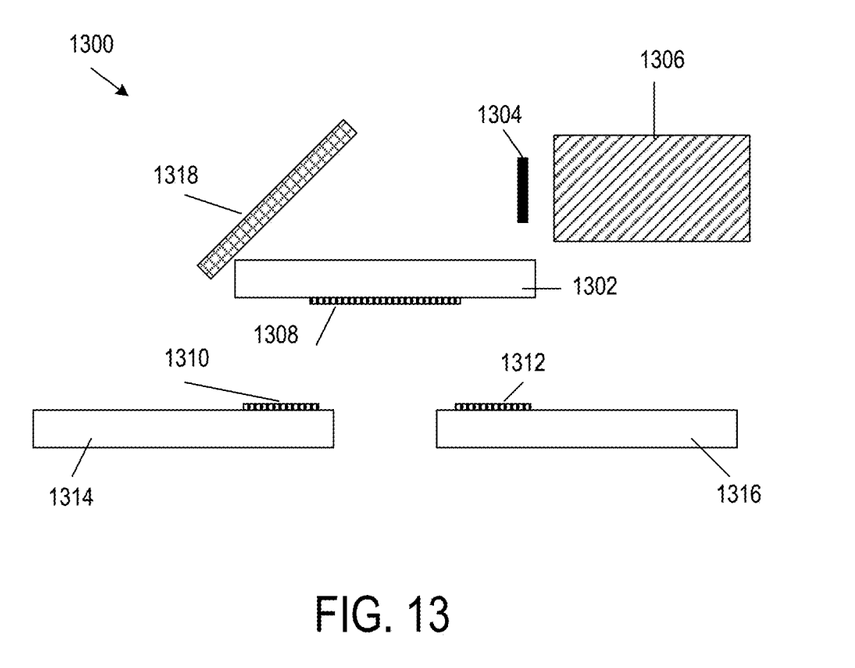
FIG. 13 schematically illustrates an example DAT optical path utilizing a combiner waveguide.

FIG. 13 schematically depicts another example DAT system 1300 comprising a combiner waveguide 1302 in a top view. DAT system 1300 is an example implementation of DAT system 1200. Similar to DAT system 1200, DAT system 1300 also comprises a visible light filter 1304 and a camera 1306. While depicted upstream of camera 1306, visible light filter 1304 can comprise one or more filters located at other suitable location(s) along a DAT optical path (not shown for clarity) in other examples.

As depicted, combiner waveguide 1302 comprises an incoupling 1308. Examples of incoupling 1308 include diffractive optics such as surface relief gratings, metagratings, and volume phase holograms. Incoupling 1308 is optically coupled to out-coupling 1310 and out-coupling 1312. This configuration can enable combining light from a left display waveguide 1314 and a right display waveguide 1316. Additionally, a mirror 1318 is configured to direct light from combiner waveguide 1302 to camera 1306. In other examples, mirror 1318 can be omitted. FIG. 13 is illustrative. In other examples, DAT system 1300 can have another configuration.

An HMD device comprising a DAT system as disclosed herein can help to maintain a desired SNR of a fiducial image at a camera while reducing a visual distraction of the fiducial image to a user of the HMD device. Further, a visual light filter located along a DAT optical path can enable color blanking. Additionally, a separate fiducial image projector along with the visual light filter can enable omitting the color blanking while helping to maintain the desired SNR of the fiducial image. Alternatively or additionally, a mirror device or a combiner waveguide may provide higher light efficiency and less weight than a prism within DAT optical path.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
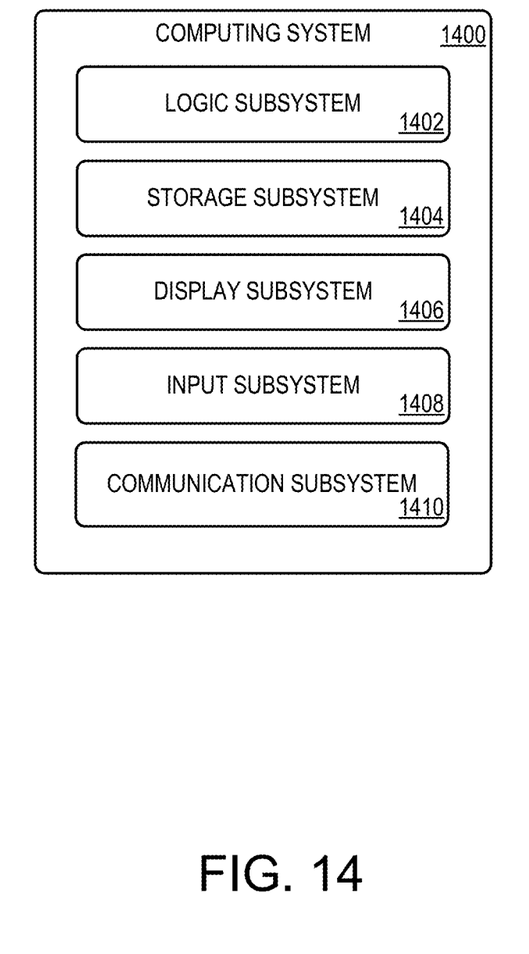
FIG. 14 shows a block diagram of an example computing device.

FIG. 14 schematically shows a non-limiting embodiment of a computing system 1400 that can enact one or more of the methods and processes described above. Computing system 1400 is shown in simplified form. Computing system 1400 may take the form of one or more personal computers, server computers, tablet computers, home-entertainment computers, network computing devices, gaming devices, mobile computing devices, mobile communication devices (e.g., smart phone), and/or other computing devices. HMD device 200 and HMD device 700 are examples of computing system 1400.

Computing system 1400 includes a logic subsystem 1402 and a storage subsystem 1404. Computing system 1400 may optionally include a display subsystem 1406, input subsystem 1408, communication subsystem 1410, and/or other components not shown in FIG. 14.

Logic subsystem 1402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 1404 includes one or more physical devices configured to hold instructions executable by the logic machine to implement the methods and processes described herein. When such methods and processes are implemented, the state of storage subsystem 1404 may be transformed—e.g., to hold different data.

Storage subsystem 1404 may include removable and/or built-in devices. Storage subsystem 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1404 may include volatile, nonvolatile, dynamic, static, read/write, read-only, random-access, sequential-access, location-addressable, file-addressable, and/or content-addressable devices.

It will be appreciated that storage subsystem 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1402 and storage subsystem 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1406 may be used to present a visual representation of data held by storage subsystem 1404. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic subsystem 1402 and/or storage subsystem 1404 in a shared enclosure, or such display devices may be peripheral display devices.

When included, input subsystem 1408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1410 may be configured to communicatively couple computing system 1400 with one or more other computing devices. Communication subsystem 1410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1400 to send and/or receive messages to and/or from other devices via a network such as the Internet.

Another example provides a head mounted display (HMD) device comprising a projection system comprising a left display image projector and a right display image projector; a left eye display optical path configured to transmit left eye images from the projection system for viewing and a right eye display optical path configured to transmit right eye images from the projection system for viewing; a display alignment tracker (DAT) system comprising, a DAT optical path comprising a left side DAT optical path and a right side DAT optical path, a camera optically coupled to an output of the DAT optical path, and a visible light filter located along the DAT optical path; and a controller configured to control the projection system to output a fiducial image comprising a visible color of light transmitted by the visible light filter, and to blank the visible color of the fiducial image from a fiducial portion of both the left eye images and the right eye images.

In some such examples, the visible color of the fiducial image alternatively or additionally is a blue color, and the controller alternatively or additionally is configured to blank the blue color from the fiducial portion of both the left eye images and the right eye images.

In some such examples, the visible light filter alternatively or additionally is configured to filter a red color and a green color.

In some such examples, fiducial portion alternatively or additionally comprises a left fiducial portion and a right fiducial portion, the fiducial image alternatively or additionally comprises a left fiducial image and a right fiducial image, and the controller alternatively or additionally is configured to control the projection system to output the left fiducial image in the left fiducial portion of the left eye images or the right fiducial image in the right fiducial portion of the right eye images.

In some such examples, the DAT system alternatively or additionally comprises a mirror device located along the DAT optical path and operable to selectively deliver light from the left side DAT optical path or the right side DAT optical path to the camera.

In some such examples, the DAT system alternatively or additionally comprises a combiner waveguide located along the DAT optical path and configured to deliver light from the left side DAT optical path and the right side DAT optical path to the camera.

Another example provides a head mounted display (HMD) device comprising a projection system comprising a left display image projector and a right display image projector; a left eye display optical path configured to transmit left eye images from the projection system for viewing and a right eye display optical path configured to transmit right eye images from the projection system for viewing; a display alignment tracker (DAT) system comprising, a DAT optical path comprising a left side DAT optical path and a right side DAT optical path, a camera optically coupled to an output of the DAT optical path, and a visible light filter located along the DAT optical path; and a controller configured to control the projection system to output a fiducial image comprising a color of light transmitted by the visible light filter.

In some such examples, the controller alternatively or additionally is configured to control the projection system to output the fiducial image comprising a visible color of light transmitted by the visible light filter, and to blank the visible color of the fiducial image from a fiducial portion of the left eye images and the right eye images.

In some such examples, the visible color of the fiducial image alternatively or additionally is a blue color, and the controller alternatively or additionally is configured to blank the blue color from the fiducial portion of both the left eye images and the right eye images.

In some such examples, the projection system alternatively or additionally comprises left and right fiducial image projectors configured to output a color of light that is not emitted from the left and right display image projectors.

In some such examples, the left and right fiducial image projectors alternatively or additionally are configured to output one or more of infrared light or ultraviolet light, and the visible light filter alternatively or additionally is configured to filter one or more visible colors of light.

In some such examples, the left and right fiducial image projectors alternatively or additionally are configured to output a visible color of light that is different than colors of light emitted from the left and right display image projectors.

In some such examples, the DAT system alternatively or additionally comprises a mirror device located along the DAT optical path and operable to selectively deliver light from the left side DAT optical path or the right side DAT optical path to the camera.

In some such examples, the DAT system alternatively or additionally comprises a combiner waveguide located along the DAT optical path and configured to deliver light from the left side DAT optical path and the right side DAT optical path to the camera.

Another example provides a head mounted display (HMD) device comprising a projection system comprising a left display image projector and a right display image projector; a left eye display optical path configured to transmit left eye images from the projection system for viewing and a right eye display optical path configured to transmit right eye images from the projection system for viewing; a display alignment tracker (DAT) system comprising, a DAT optical path comprising a left side DAT optical path and a right side DAT optical path, a camera, and a mirror device located along the DAT optical path and operable to selectively deliver light from the left side DAT optical path or the right side DAT optical path to the camera; and a controller configured to control a state of the mirror device.

In some such examples, the mirror device alternatively or additionally comprises a first mechanical state and a second mechanical state.

In some such examples, the mirror device alternatively or additionally comprises two or more mechanical stops located such that the two or more mechanical stops provide the first mechanical state and the second mechanical state of the mirror device.

In some such examples, a portion of the mirror device alternatively or additionally is formed in a frame of the HMD device.

In some such examples, the HMD device alternatively or additionally comprises a molded interconnect substrate in a portion of the frame to create the at least the portion of the mirror device.

In some such examples, the DAT system alternatively or additionally comprises a visible light filter located along the DAT optical path, and the controller alternatively or additionally is configured to control the projection system to output a fiducial image comprising a color of light transmitted by the visible light filter.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head mounted display (HMD) device comprising:
   a projection system comprising a left display image projector and a right display image projector;
   a left eye display optical path configured to transmit left eye images from the projection system for viewing and a right eye display optical path configured to transmit right eye images from the projection system for viewing;
   a display alignment tracker (DAT) system comprising,
      a DAT optical path comprising a left side DAT optical path and a right side DAT optical path,
      a camera optically coupled to an output of the DAT optical path, and
      a visible light filter located along the DAT optical path; and
   a controller configured to control the projection system to output a fiducial image comprising a visible color of light transmitted by the visible light filter, and to blank the visible color of the fiducial image from a fiducial portion of both the left eye images and the right eye images.

2. The HMD device of claim 1, wherein the visible color of the fiducial image is a blue color, and the controller is configured to blank the blue color from the fiducial portion of both the left eye images and the right eye images.

3. The HMD device of claim 2, wherein the visible light filter is configured to filter a red color and a green color.

4. The HMD device of claim 1, wherein the fiducial portion comprises a left fiducial portion and a right fiducial portion, the fiducial image comprises a left fiducial image and a right fiducial image, and the controller is further configured to control the projection system to output the left fiducial image in the left fiducial portion of the left eye images or the right fiducial image in the right fiducial portion of the right eye images.

5. The HMD device of claim 1, wherein the DAT system further comprises a mirror device located along the DAT optical path and operable to selectively deliver light from the left side DAT optical path or the right side DAT optical path to the camera.

6. The HMD device of claim 1, wherein the DAT system further comprises a combiner waveguide located along the DAT optical path and configured to deliver light from the left side DAT optical path and the right side DAT optical path to the camera.

7. A method of operating a head mounted display (HMD) device comprising a projection system, the method comprising:
   transmitting a left fiducial image from the projection system along a left side display alignment tracker (DAT) optical path, the left fiducial image having a selected color of visible light;
   transmitting a left eye image from the projection system along a left eye display optical path for viewing, and blanking the selected color of visible light from a fiducial portion of the left eye image;
   transmitting a right fiducial image from the projection system along a right side display alignment tracker (DAT) optical path, the right fiducial image having the selected color of visible light;
   transmitting a right eye image from the projection system along a right eye display optical path for viewing, and blanking the selected color of visible light from a fiducial portion of the right eye image;
   transmitting the left fiducial image and the right fiducial image through a color filter of the DAT optical path while filtering another color of visible light than the selected color of visible light with the color filter; and
   detecting the left fiducial image and the right fiducial image with a camera.

8. The method of claim 7, wherein a visible color of the fiducial image is a blue color.

9. The method of claim 8, wherein filtering the other color of visible light than the selected color of light with the color filter comprises filtering a red color and a green color.

10. The method of claim 7, further comprising selectively delivering the left fiducial image or the right fiducial image to the camera by controlling a mirror.

11. The method of claim 1, further comprising delivering the left fiducial image and the right fiducial image to the camera with a combiner waveguide.

\* \* \* \* \*